Dec. 4, 1934. R. M. STEPHENS ET AL 1,983,321
WELDING APPARATUS
Filed Sept. 19, 1933
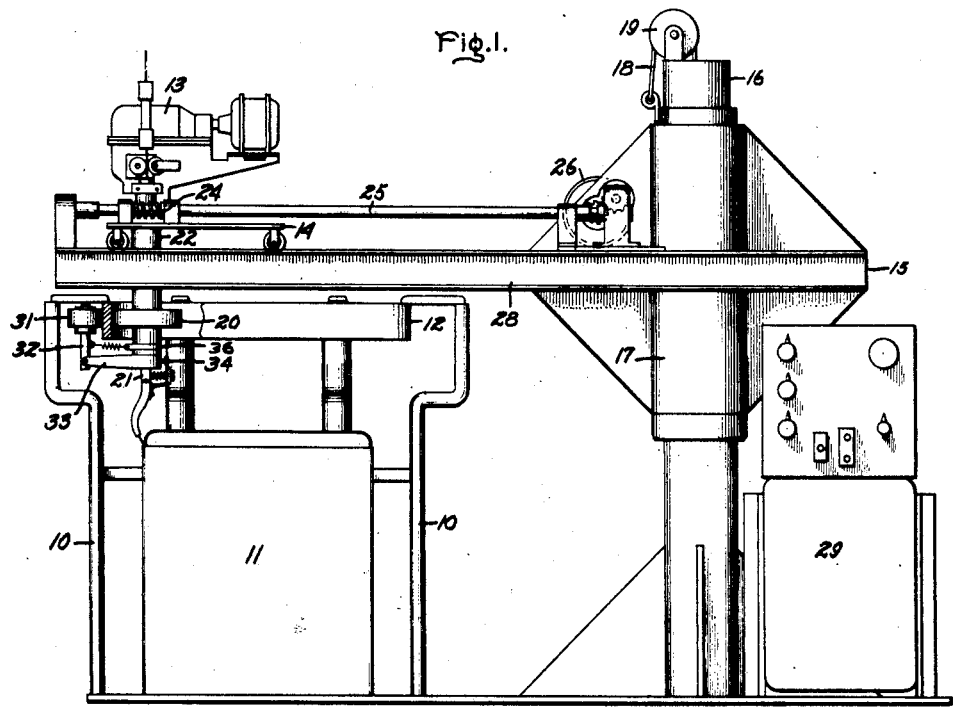
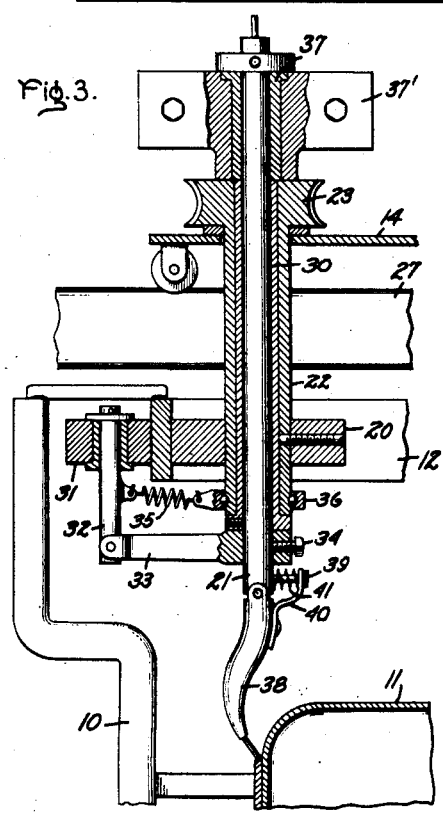
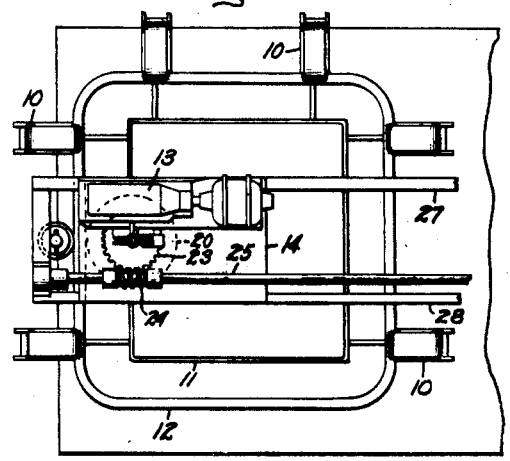
Inventors:
Robert M. Stephens,
Verni J. Chapman,
by Harry E. Dunham
Their Attorney.

Patented Dec. 4, 1934

1,983,321

UNITED STATES PATENT OFFICE 1,983,321

WELDING APPARATUS

Robert M. Stephens, Scotia, and Verni J. Chapman, Schenectady, N. Y., assignors to General Electric Company, a corporation of New York Application September 19, 1933, Serial No. 690,060

5 Claims. (Cl. 219—8)

Our invention relates to welding apparatus.

It is an object of our invention to provide means for maintaining a welding tool in a predetermined position relative to a seam of predetermined configuration along which it is directed during the welding operation.

For example, in arc welding where an electrode is supplied through a curved nozzle in order to supply welding current thereto, or to direct it toward the work at a predetermined angle relative to the direction of welding according to our invention, the nozzle is rotated at those points where the direction of welding changes in order to maintain the desired position of the nozzle relative to the seam and the direction of welding.

Further objects of our invention will become apparent from a consideration of the following description of an embodiment illustrated in the accompanying drawing, Fig. 1 of which shows a side view of an arc welding machine in which guiding means embodying our invention has been used; Fig. 2 of which shows a plan view of the left hand portion of the machine shown in Fig. 1, and Fig. 3 of which shows the relation of the nozzle and guiding means illustrated in Figs. 1 and 2 of the drawing.

The machine of Figs. 1 and 2 comprises a work holder 10 in which the work 11 is supported in fixed position relative to a guide track 12. In the arrangement illustrated, this guide track is supported on the work holder but this method of support is not necessary since other means may be provided for positioning it relatively to the work holder and the work located therein. The machine illustrated in Figs. 1 and 2 is an arc welding machine, and the welding tool constitutes an automatic arc welding head 13. This welding head is supported on a carriage 14 movable along a frame 15 which is pivotally and slidably supported on a vertically disposed pillar 16 by means of a bearing 17 attached to the frame and journaled on the pillar. By reason of its pivotal support the frame 15 may swing over the work in a horizontal plane and by reason of its sliding support it may be adjusted vertically to accommodate different kinds of work located in appropriate holders. The frame is counterbalanced by a weight located within the pillar 16 and attached to the bearing 17 by a cable 18 which extends over a pulley 19 attached to the pillar. The pillar 16 and work support 10 are located on a common base which may or may not form an integral part of the machine.

The welding tool is guided along the seam by means of a wheel 20 through which the nozzle 21 of the welding head 13 extends. This wheel is journaled on the nozzle and connected by a hollow shaft 22 to a worm wheel 23. This worm wheel is driven by a worm 24 which is slidably mounted on a shaft 25 which extends along the frame 15. The inner end of this shaft is connected to a motor through gearing 26 by means of which rotation is imparted to it and through worm 24 and worm wheel 23 to the guide wheel 20. The carriage 14 is provided with flanged wheels which travel along the parallel disposed beams 27 and 28 of the frame 15. The to and fro movement of the carriage 14 on the frame 15 and the swinging of the frame 15 over the work in response to the guiding action of the wheel 20 on the guide track 12 enables the welding tool to follow any irregular configuration determined by the guide track 12 which is similar in shape to the seam to be welded in the work 11. The control for the welding head and the motor for rotating shaft 25 is indicated at 29.

The construction of the guiding means associated with the welding tool is illustrated in detail in Fig. 3 of the drawing. It will be noted that the hollow shaft 22 by means of which the worm wheel 23 is connected to the guide wheel 20 is journaled on a bearing 30 which is mounted on the nozzle 21. It will also be noted that the wheel 20 is held in engagement with the guide track 12 by another wheel 31 which is pivotally supported on an arm 32 in turn supported by a collar 33 attached to nozzle 21 by a set screw 34. The wheels 20 and 31 engage the opposite sides of the guide track 12 and are held in engagement therewith through the biasing action of a spring 35 one end of which is attached to a collar 36 rotatably mounted on shaft 22 and the other end of which is attached to the arm 32 for the roller 31. The nozzle 21 is attached to the welding head 13 by means of a clamp 37' in which it is rotatably supported by a bearing 37. Inasmuch as the welding head 13 is supported on the carriage 14 the nozzle 21 is in effect supported on the carriage and held in fixed relation thereto, but free to rotate about its own axis under the influence of wheel 31 which is attached thereto by arm 32 and collar 33. The tip of the nozzle 38 is pivotally supported from the body of the nozzle 21 and may be swung laterally thereof by means of an adjusting screw 39 which engages an arm 40 attached to the nozzle tip. The arm 40 is biased against the head of the screw 39 by means of a spring 41.

It will be noted that the guide track in the apparatus above described is spaced outwardly from the seam to be welded a uniform distance equal to the radius of the guide wheel. The guide track is thus formed of sections parallel to the seam to be welded and connected at their ends by arcs tangent thereto and of the same curvature as the guide wheel. Consequently, at those points in the seam where the direction of welding is suddenly changed the guide wheel engages the track along an extended surface which prevents slippage between the guide track and the guide wheel. It is of course within the contemplation of my invention to give to the guide track the same configuration as that on the seam to be welded but when this construction is employed the guide wheel will always make a line contact with its track and the advantages obtained by employing the preferred construction above noted are not then obtained.

In the arrangements above described the welding tool has been illustrated as an automatic arc welding machine. It is, of course, to be understood that the welding tool is not necessarily an arc welding tool but may be a gas welding or other type tool. In either case the welding tool acts as a support for the guide wheel through which it extends. In the arrangements illustrated the tool extends through the axis of rotation of the guide wheel, but this construction is not necessary since by disposing the tool radially from the center of rotation of the guide wheel a suitable oscillating motion may be imparted to the welding tool. Other means than those particularly illustrated and described above may be employed for holding the welding tool in a predetermined position relative to the seam and the direction of welding. The welding tool may be supported in any suitable manner for movement along the guide track, and our invention is not limited to the particular swinging frame arrangement illustrated and described above since other constructions may be employed for supporting the welding tool for movement along the guide track.

The application of V. J. Chapman, Serial No. 690,059, for Welding apparatus, filed concurrently herewith and assigned to the same assignee as the present application discloses and claims welding apparatus in which a guide wheel journaled on the welding tool and engaging a guide track is employed for directing it along a seam of predetermined configuration. This application of V. J. Chapman also discloses and claims the particular supporting structure for the welding tool and guiding means illustrated and described in this application.

What we claim as new and desire to secure by Letters Patent of the United States, is:

1. Welding apparatus comprising a guide track, a welding tool, means for supporting said tool for movement along said track, a wheel journaled on said tool, and means for holding said wheel in engagement with said track and for rotating said tool to maintain it in a predetermined position relative to the direction of welding.

2. Welding apparatus comprising a guide track, a welding tool, means for supporting said tool for movement along said track, a wheel journaled on said tool, means for holding said wheel in engagement with said track and for rotating said tool to maintain it in a predetermined position relative to the direction of welding, and means for rotating said wheel.

3. Apparatus for welding a seam of predetermined configuration comprising a welding tool, a guide track of said configuration, means for supporting said tool for movement along said track, and means engaging said track for holding said tool in a predetermined position relative to said seam and the direction of welding.

4. Apparatus for arc welding a seam of predetermined configuration comprising an electrode nozzle having a curved terminal portion, a guide track of said configuration, a wheel journaled on said nozzle and engaging said track, means attached to said nozzle and engaging said track for holding said wheel in engagement with said track and for maintaining the curved portion of said nozzle in a predetermined position relative to said seam, and means for rotating said wheel.

5. Welding apparatus comprising a guide track, a welding tool, a wheel journaled on said tool and operating on said track, means for supporting said tool for movement along said track and for rotation about its own axis, an arm attached to said tool and pivoted for swinging movement at right angles to said track, a wheel journaled on said arm and operating on said track, means for biasing said arm and said tool toward one another and for holding said wheels in engagement with said track, and means for rotating one of said wheels.

ROBERT M. STEPHENS.
VERNI J. CHAPMAN.